March 12, 1940. W. S. GOERTZEN 2,193,404
FISHING LINE BOB
Filed April 16, 1938
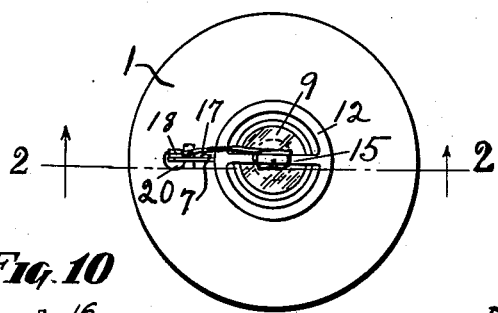
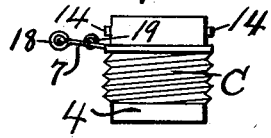
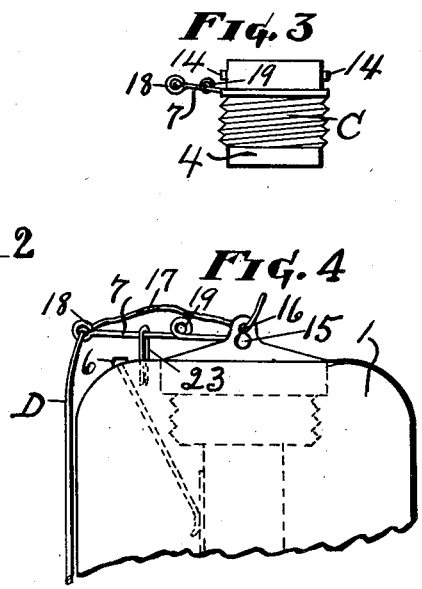
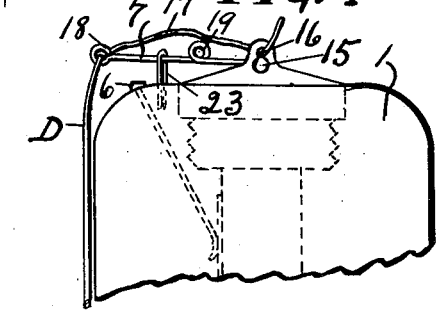
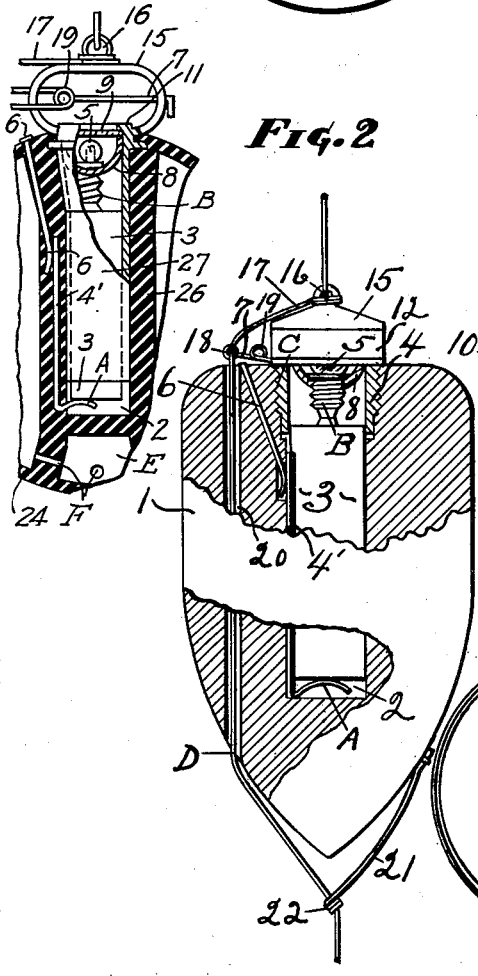
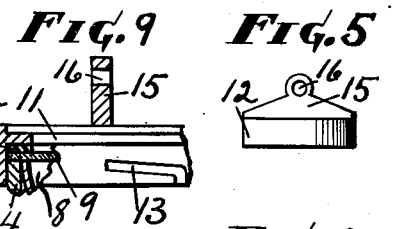
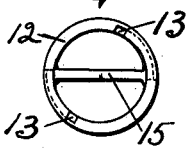
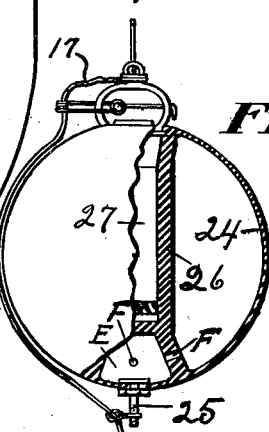
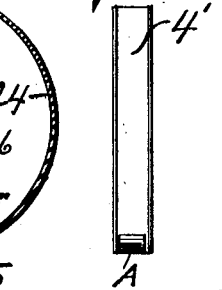
INVENTOR.
WILLIAM S. GOERTZEN
BY U. G. Charles
ATTORNEY.

Patented Mar. 12, 1940

2,193,404

UNITED STATES PATENT OFFICE 2,193,404

FISHING LINE BOB

William S. Goertzen, Newton, Kans.

Application April 16, 1938, Serial No. 202,504

3 Claims. (Cl. 43—17)

My invention relates to a fishing line bob and has for its principal object an illuminating means unbalancing the bob and causing the same to rock sidewise or to an inverted position.

A further object of this invention is to enclose a battery by placing the same in an axially positioned opening, one end of which is closed and the other end being open to receive the battery and light producing element insertible therein.

A still further object of my invention is to provide a resilient current conducting element upon which the battery will seat at its inner end, said element as circuit conducting means between the battery and the lamp, and a switch means to close the circuit, last said means actuated to a closed position by a jerk of a fish on the line that is connected to the switch arm.

A still further object of my invention is to provide a removable cap as fluid tight enclosing means for the lamp, the cap being provided with a lens as transparent means for the light rays.

A still further object of my invention is to provide an electric light system that is insertible within a bob that is collapsible, the bob being subject to inflation increasing its buoyant capacity whereby deep line fishing is possible.

These and other objects will hereinafter be more fully explained, reference being had to the accompanying drawing forming a part of this specification, and in which like characters will apply to like parts in the different views.

Referring to the drawing—

Fig. 1 is a top or plan view of the bob.

Fig. 2 is a side view of the bob, the body portion of which is partly in section taken on line 2—2 in Fig. 1.

Fig. 3 is a side view of the sleeve having one side of the switch thereon.

Fig. 4 is a fragmentary view of the bob, modified to conceal the upper portion of the sleeve and lamp within the bob.

Fig. 5 is a side view of the cap as closing means for the upper end of the sleeve.

Fig. 6 is an inverted plan view of the cap, showing the channels in which pins extending from the sleeve will engage.

Fig. 7 is an inside view of the contact and flexible carrying means for the battery.

Fig. 8 is a side view of the pneumatic bob modified to flex varying the size thereof by inflating or deflating the same, parts removed for convenience of illustration.

Fig. 9 is an enlarged sectional view of the cap fragmentarily illustrated and showing one of the channels in which its respective pin will engage.

Fig. 10 is an enlarged detail showing the electrical arrangement modified as required for its installation in the structure of Fig. 8.

This invention herein disclosed consists of a bob 1, the body of which is of wood or the like, the lower end being conical in form, the body having an axially positioned bore 2 extending inward from the upper end and terminating a spaced distance from the lower end as shown in Fig. 2, said bore being cylindrical with respect to cross section to receive a battery 3 insertible therein. The bore from the upper end of the battery outward is enlarged and threaded to engage a threaded sleeve 4 fluid tight and the bore of the sleeve is equal to the bore in the bob. The said battery is flexibly supported by seating the same on a transversely positioned portion of a current conducting element 4, said portion being arcuate in form as at A to cause contact of the battery with the base B of a lamp 5. The said conducting element 4 is arranged to engage with an obliquely positioned element 6, said element extending upward and outward and fitting snugly in its slot positioned in the body of the bob. The said element 6 protrudes from the top of the bob sufficiently to contact with a resilient switch arm 7 when said switch arm is forced downward thereon.

The said switch arm is connected to said sleeve 4 in which a reflector 8 is positioned in contact with the sleeve. The reflector is axially bored and threaded to receive the threaded base B of the lamp, and being so arranged the said switch arm will make and break the current between the battery and lamp.

Fig. 9 shows a structure preferred to that shown in Fig. 2 in which the annular edges of the reflector and sleeve end are alined and on them is placed a lens 9 sealing the lamp and made fluid tight by an annular gasket 10 that is compressed by an annular flange 11 integrally joined to cap 12, said cap having a pair of grooves 13 oppositely positioned and slanting upward, one of which is shown in said Fig. 9, said grooves to engage on pins 14 oppositely positioned and outwardly extending from said sleeve and spaced a short distance from the end thereof by which means when the grooves receive their respective pins and turned clockwise the said gasket is clamped fluid tight.

Diametrically crossing the cap and upwardly extending therefrom is a bridge 15, said bridge having an aperture 16 centrally positioned to receive a line 17 slidable and wound on the neck adjacent the aperture or the aperture as shown in Fig. 4 may have a groove 16' in which the line will be wedged to avoid slipping. The said line engages snugly between the winds of a coil 18 that is integrally joined to the outer end of the said switch arm 7 while the other end of said arm is joined to the sleeve between its threads C and pins 14. The said arm has a coil 19 as flexing means therefor when the arm is forced downward by a jerk on the portion D of the line to make contact with the outer exposed end of element 6 closing the circuit between the lamp and battery, it being understood that the inner or lower end of element 6 is in contact with the upper end of element 4 upon which the battery is seated at its lower extremity.

Eccentrically positioned and in parallelism with the axis of the bore is an aperture 20 through which the line will engage and to insure axial alinement of the line extending downward from the bob I have secured one end of an anchor 21 to the conical portion of said bob and have provided on the free end of the anchor a coil 22 through which said line will engage, the coil terminating at the axis of the bob.

In Fig. 4 is shown a modification wherein the sleeve and cap are enlarged and positioned inwardly of the bob so that the upper extremity of the cap will be on a plane with the upper extremity of the bob. Being so concealed the switch arm is carried at its inner end by the bridge, the outer portion being guided in its vertical movement by a staple 23 between which the said arm is free to move, said staple being driven in the head of the bob. The length of the arm is sufficient to avoid the necessity of aperture 20 permitting the line to slide freely externally of the bob.

In Fig. 8 is shown a modification with respect to the body of a bob that is pneumatic, spherical in form and hollow, the shell 24 of which is of flexible rubber and subject to inflation by injecting air through a valve 25, said valve communicating in a cavity E having a plurality of apertures F spaced around its wall 26 through which the air will flow by which means the body of the bob will be varied in size according to its buoyant requirement and the said bob is also equipped with a battery, lamp and switch mechanism, the battery and lamp insertible in a metallic tube 27 axially positioned in the wall, the circuit conduction being arranged as shown in Fig. 10, the function of which will be the same as that shown and described with respect to Fig. 2, and such other modifications may be employed as lie within the scope of the appended claims.

Having fully described my invention, what I claim as new and desire to secure by Letters Patent is:

1. In a fishing line bob, a flexible collapsible body, means to inflate said body to a desired buoyancy, a battery and means to carry the same with the body concentric thereto, an electric lamp positioned in the body adjacent to and in contact with one end of the battery, an electric current conducting means positioned in the body and in contact with the other end of the battery, a switch arm adapted to contact with the free end of said conductor, means to attach a line to said spherical body oppositely and in such a way that the said line will move the arm into contact with the free end of said current conducting means to light the lamp when said line is tensioned outward from each connecting means.

2. In a fishing line bob, a flexible shell spherical in form, a tubular element diametrically positioned in the spherical shell, said tubular element being open at its outer end to receive a metallic tube inserted therein and a battery positioned in the metallic tube but electrically insulated therefrom, an electrical conductor imbedded in the wall of the first named tubular element and being in contact with the inner end of the battery while the other end extends outward from the shell and is adjacent the open end of first said tube, an electric lamp carried by the metallic tube and being in contact with the battery, means secured to the said tube to which a fishing line may be attached, said means having a flexible arm secured thereto to close the circuit between the battery and lamp when in contact with the current conductor, and means adjacent at the closed end of said tubular element for the injection of air to inflate the said flexible shell substantially as shown.

3. In a fishing line bob, a hollow flexible body portion, a hollow tubular element diametrically positioned in said body portion, one end of which is open, the other end being closed and integrally joined to the body portion inward thereof and provided with an apertured cavity, the apertures communicating with the interior of said flexible body, and an air valve communicating with the cavity and extending outward therefrom by which means the flexible body may be inflated to a desired size and the said tubular element to carry an electric lighting system substantially as shown.

WILLIAM S. GOERTZEN.